United States Patent [19]

Hall, Jr.

[11] Patent Number: 4,470,342

[45] Date of Patent: Sep. 11, 1984

[54] AIR-HANDLING UNIT

[76] Inventor: William K. Hall, Jr., 4350 N. Central Exp., Dallas, Tex. 75206

[21] Appl. No.: 376,914

[22] Filed: May 10, 1982

Related U.S. Application Data

[60] Division of Ser. No. 204,901, Nov. 7, 1980, Pat. No. 4,328,926, which is a continuation of Ser. No. 907,682, May 19, 1978, abandoned.

[51] Int. Cl.³ .............................................. F24F 13/04
[52] U.S. Cl. ....................................... 98/38 E; 98/119; 137/894
[58] Field of Search ............... 236/13, 38, 49; 165/16; 98/38 E, 38 F, 31, 119, 121 A, 38 B, 38 C, 38 D; 137/894, 895; 251/212

[56] References Cited

U.S. PATENT DOCUMENTS

| | | | |
|---|---|---|---|
| 2,238,688 | 4/1941 | Guler | 165/16 |
| 2,633,070 | 3/1953 | Gillham | 98/38 F |
| 2,663,244 | 12/1953 | MacDowell | 98/38 E |
| 2,783,979 | 3/1957 | Blum | 98/38 E X |
| 3,115,819 | 12/1963 | Mahlmeister et al. | 98/31 X |
| 3,516,606 | 6/1970 | Edwards | 137/895 X |
| 3,611,908 | 10/1971 | Spoormaker | 98/38 E |
| 3,638,679 | 2/1972 | Gorchev | 137/894 X |
| 3,929,285 | 12/1975 | Daugherty, Jr. | 236/13 |
| 3,951,205 | 4/1976 | Zilbermann | 165/16 |
| 4,108,238 | 8/1978 | Vary et al. | 98/119 X |

Primary Examiner—William E. Tapolcai
Attorney, Agent, or Firm—Thomas L. Crisman; Stanley R. Moore

[57] ABSTRACT

The present invention provides an air-handling unit that can supply air, to a desired space, which is cold, which is cooler than the set point of the thermostat for that space and hence is referred to as cool air, which is warmer than that set point and hence is referred to as warm air, or which is hot. That unit can operate even when very low pressure air is supplied to it; and hence it is connectable to a conventional low pressure cold air duct. That unit may have a heat source incorporated into it, may utilize air from that space which is cooler than that set point and hence can be referred as cool air, and may utilize air from that space which is warmer than that set point and hence can be referred to as warm air. Dampers in that unit control the amount of cold air and cool air that is supplied to that space, and a blower and the heat source in that unit control the amount of warm air and hot air which is supplied to that space. Backdraft dampers in that unit permit aspiration of cool or warm air, but can substantially prevent the escape of any air from that unit even if a super-atmospheric downstream pressure develops.

23 Claims, 5 Drawing Figures

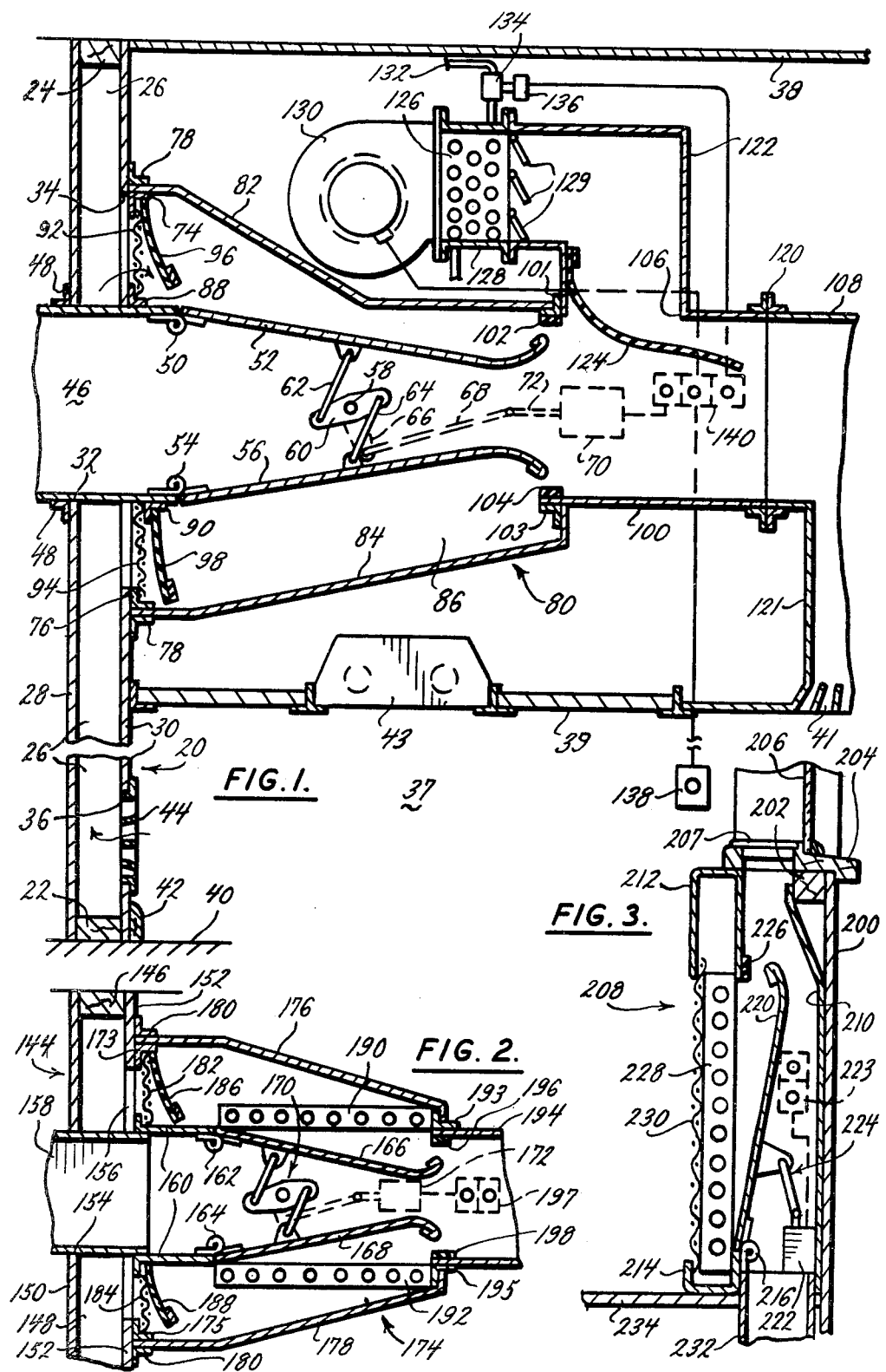

AIR-HANDLING UNIT

This is a division of application Ser. No. 204,901, filed Nov. 7, 1980, now U.S. Pat. No. 4,328,926, which is a continuation of application Ser. No. 907,682, filed May 19, 1978, now abandoned.

SUMMARY OF THE INVENTION

The present invention provides an air-handling unit that can supply air, to a desired space, which is cold, which is cooler than the set point of the thermostat for that space and hence is referred to hereinafter as cool air, which is warmer than that set point and hence is referred to hereinafter as warm air, or which is hot. That unit can operate even when very low pressure air is supplied to it; and hence it is connectable to a conventional low pressure cold air duct. That unit may have a heat source incorporated into it, may utilize air from that space which is cooler than that set point and hence is referred to hereinafter as cool air, and may utilize air from that space which is warmer than that set point and hence is referred to hereinafter as warm air. When only cold air is required, cold-air dampers within that unit will be open; but when cool air is required, those cold-air dampers will be intermediate their open and their minimum-flow positions. When hot air is required, the heat source will be supplying heat and the cold-air dampers will be in their minimum-flow positions; but when only warm air is required, that heat source will be supplying little or no heat. It is, therefore, an object of the present invention to provide an air-handling unit which can supply air to a desired space, which can operate even when very low pressure air is supplied to it, which is connectable to a conventional low pressure cold air duct, which may have a heat source incorporated into it, which may utilize cool air from that space, and which may utilize warm air from that space.

Some of the air-handling units provided by the present invention have backdraft dampers. Those dampers permit those units to aspirate air into them, but will substantially prevent the escape of any air from those units, even if a super-atmospheric downstream pressure develops. As a result those units can be incorporated into a duct system at any desired location between the primary air-moving unit and downstream duct outlets. It is, therefore, an object of the present invention to provide an air-handling unit which can be incorporated into a duct system at any desired location between the primary air-moving unit and the downstream duct outlets, and which can permit air to be aspirated into it when the downstream pressure is below the ambient pressure, but which will substantially prevent the escape of any air when that downstream pressure exceeds that ambient pressure.

Other and further objects and advantages of the present invention should become apparent from an examination of the drawing and accompanying description.

In the drawing and accompanying description, several preferred embodiments of the present invention are shown and described, but it is to be understood that the drawing and accompanying description are for the purpose of illustration only and do not limit the invention and that the invention will be defined by the appended claim.

BRIEF DESCRIPTION OF DRAWING

In the drawing, FIG. 1 is a partially-broken, vertical section through part of a building in which one preferred embodiment of air-handling unit provided by the present invention is mounted, FIG. 2 is a vertical section through part of a building in which a second preferred embodiment of air-handling unit provided by the present invention is mounted, FIG. 3 is a vertical section through part of a building where a third preferred embodiment of air-handling unit provided by the present invention is mounted.

DESCRIPTION OF THE PREFERRED EMBODIMENTS

Figure 4:
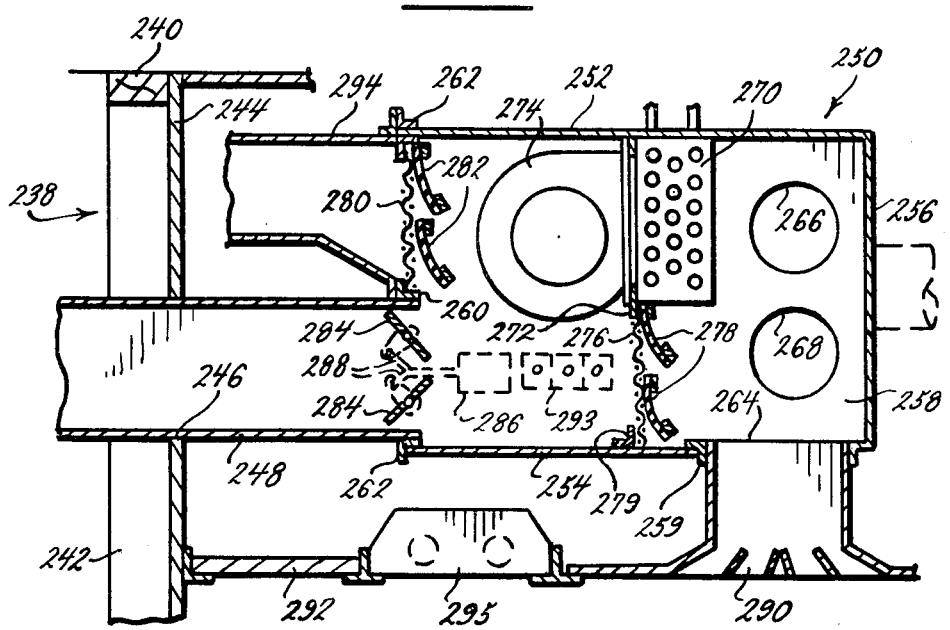
FIG. 4 is a vertical section through part of a building where a fourth preferred embodiment of air-handling unit provided by the present invention is mounted.

Referring particularly to FIG. 1, the numeral 20 generally denotes a wall of a building; and a sill 22 and a header 24 are located, respectively, at the bottom and top of that wall. A stud 26, plus similar studs not shown, extends between that sill and that header. The numeral 28 denotes wallboard, plaster-on-lath, or the like which defines the left-hand face of wall 20. The numeral 30 denotes wallboard, plaster-on-lath, or the like which defines the right-hand face of that wall. A generally-rectangular opening 32 is formed in that left-hand face; and generally-rectangular openings 34 and 36 are formed in that right-hand face. The opening 36 is close to the bottom of wall 20, the opening 32 is close to the top of that wall, and the opening 34 is in register with, but is considerably larger than, the opening 32.

The numeral 39 denotes the ceiling, and the numeral 40 denotes the floor, of a room 37 which has one side thereof defined by the wall 20. That room could be a room, corridor, entry area, hall, auditorium, work area or other space in a home, club, store, office building, public building, factory, warehouse, industrial building, or other structure. A horizontal member 38 is spaced above the ceiling 39 to help define a plenum, such as an attic, or a between-floor space, which can receive warm air from the room 37—either directly through grilles, not shown, in the ceiling 39, through openings in or adjacent to lighting fixtures 43 in that ceiling, or indirectly by leakage through that ceiling. A discharge outlet 41 is provided in the ceiling 39; and, if the room 37 is large, further discharge outlets will be provided in that ceiling. A baseboard 42 abuts the right-hand face of the wall 20 adjacent the floor 40. A grille 44 is disposed within the opening 36; and, depending upon the height of the room 37, that grille could be displaced just a few feet, or could be displaced many feet, below the ceiling 39.

The numeral 46 denotes a conventional low pressure, cold-air duct which receives cold air from a primary air-moving unit and refrigeration unit not shown. The duct 46 will be suitably supported by hangers of standard and usual design, not shown. Tape 48 of standard and usual design will be used to seal the joint between the opening 32 in the left-hand face of wall 20 and duct 46.

The numeral 50 denotes a hinge that is secured to the upper wall of duct 46 and to the left-hand end of an enlongated vane or damper 52. That hinge could be an elongated piano-type hinge or could be a number of aligned short hinges. The vane 52 is planar throughout the greater portion of its area but is bent upwardly adjacent the right-hand end thereof, and it has the free edge thereof bent as a re-entrant fold. The numeral 54 denotes a hinge which is secured to the lower wall of duct 46 and to the left-hand end of a vane or damper 56 which is a mirror image of vane 52. The numeral 58 denotes an axle which is rotatably mounted, which has a lever 60 fixedly secured to one end thereof, and which has a crank arm 66 fixedly secured to the other end thereof. A connecting link 62 is pivotally secured to one end of lever 60 and to the vane 52, and a connecting link 64 is pivotally secured to the other end of that lever and to the vane 56. An actuating motor 70, which is shown as a pneumatic motor but which could be an electric, electronic, hydraulic, or other motor, has the actuator 72 thereof connected to the crank arm 66 by a connecting rod 68. That motor can cause the right-hand ends of the vanes 52 and 56 to move to a minimum-flow position, or can cause those vanes to move to their full open position, wherein the right-hand ends thereof engage resilient stops 102 and 104. Further, the motor 70 can set those vanes in any desired positions intermediate their minimum-flow and full open positions; and FIG. 1 shows one such intermediate position. In their minimum-flow position, the free ends of the vanes 52 and 56 could abut each other to effectively block the passage of cold air therebetween, or those free ends could be held a short distance apart to permit a limited amount of cold air to pass between them. In their full-open positions, the vanes 52 and 56 will reduce the pressure drop across the air-handling unit of FIG. 1 to a minimum pressure drop of one hundredth of an inch water gauge. As a result, that unit can be used with very low pressure cold air ducts.

The numeral 74 denotes an angle iron which constitutes the upper part of a frame that is mounted adjacent the opening 34 in the right-hand face of wall 20; and the numeral 76 denotes an angle iron which defines the bottom part of that frame. Angle irons which define the sides of that frame are not shown, but they extend between and are rigidly secured to the angle irons 74 and 76.

The numeral 80 generally denotes a housing for the vanes 52 and 56; and that housing has an upper wall 82 which has a horizontally-directed left-hand portion, an intermediate portion which inclines downwardly from upper left to lower right, and a horizontally-extending right-hand portion. The numeral 84 denotes the bottom wall of the housing 80; and it has a horizontally-extending left-hand portion, an intermediate portion which inclines upwardly from lower left to upper right, and a right-hand vertically-directed, upwardly-extending portion. The numeral 86 denotes one side wall of the housing 80; and that side wall is generally pentagonal in configuration.

The other side wall, not shown, also will be generally pentagonal in configuration. The top wall 82 will be releasably secured to angle iron 74 and to an angle iron 101; and it will abut the upper edges of side wall 86 and of the other side wall. The bottom wall 84 will be releasably secured to angle iron 76 and to an angle iron 103; and it will abut the lower edges of side wall 86 and of the other side wall. Tape 78 is used to seal the joint between the right-hand face of wall 20 and housing 80.

The numeral 88 denotes an angle iron which is secured to the top wall of duct 46 adjacent the opening 34 in the right-hand face of wall 20. The numeral 90 denotes an angle iron which is secured to the bottom wall of that duct adjacent that opening. The numeral 92 denotes a screen, made of hardware cloth or other porous material, which is secured to angle irons 74 and 88 and which fills the space between the upper edge of opening 34 and the top wall of duct 46. The numeral 94 denotes a further screen of hardware cloth or other porous material which is secured to angle irons 90 and 76 and which fills the space between the lower edge of opening 34 and the bottom wall of duct 46. The screens 92 and 94 incline downwardly from upper left to lower right at angles of about four degrees from the vertical. The numeral 96 denotes a backdraft damper which is secured to angle iron 74 or to the upper edge of screen 92; and that backdraft damper will normally be planar in configuration and will normally abut the right-hand face of screen 92. However, that backdraft damper is very flexible; and it will respond to even a very small reduced pressure at the right-hand face thereof to flex to the position shown by FIG. 1. The numeral 98 denotes a backdraft damper which is secured to angle iron 90 or to the upper edge of screen 94; and that backdraft damper normally will be planar in configuration and will normally abut the right-hand face of that screen. However, that backdraft damper will respond to even a very small reduced pressure at the right-hand face thereof to flex to the position shown by FIG. 1.

The numeral 100 denotes a short duct which telescopes within the right-hand end of housing 80; and resilient stop 104 is secured to that duct. Resilient stop 102 is secured to the bottom of angle iron 101. An opening 106 is provided in the top of duct 100 adjacent the left-hand end of that duct. A further duct 108 is connected to the outlet of duct 100 by an angle iron joint 120 of standard and usual design. An arm 121 of duct 100 extends downwardly to, and supports, discharge outlet 41.

The numeral 122 denotes an L-shaped housing which is connected to, and which extends upwardly from, the opening 106 in duct 100. A curved vane 124 is secured to housing 122; and that vane curves downwardly and to the right into the duct 100. The numeral 126 denotes a heat source that has an enclosure 128; and that enclosure is connected to the left-hand end of L-shaped housing 122. That heat source is shown as a hot water coil; but it could be a steam coil, an electric resistance element, or a gas-fired heater. Backdraft dampers 129 are mounted at the outlet of the heat source 126; and those dampers can be standard and usual air-moved metal dampers. The numeral 130 denotes a motor-driven, multi-vane blower which has the outlet thereof secured to the enclosure 128 for heat source 126. An inlet pipe 132 has a valve 134 therein; and that valve can be selectively set and held in open, closed, or any intermediate position by a valve controller 136. The numeral 138 denotes a thermostat which is located within the room 37, and which provides a variable output, rather than an on-off output, in response to changes in the temperature of the ambient air. One such thermostat is a pneumatic thermostat; but electric, electronic, thermistor-type, and other variable output thermostats could be used. The numeral 140 denotes a control unit which will respond to the output of thermostat 138 to provide variable outputs, rather than on-off outputs, that can control motor 70, control the motor for blower 130, and control the valve controller 136. The thermostat 138 will have a control range of two to three degrees Fehrenheit; and it will have a set point intermediate the upper and lower limits of that range. That set joint usually will be, and throughout this description will be considered to be, at the midpoint of that range.

If the temperature of the air adjacent thermostat 138 is above the upper limit of the control range of that thermostat, that thermostat will provide an output which will cause control unit 140 to develop outputs that will keep the motor of blower 130 inactive, will cause valve controller 136 to leave valve 134 closed, and will cause motor 70 to hold vanes 52 and 56 in their full-open position. At such time, a full volume of low pressure cold air from duct 46 will pass through duct 100, below and past the vane 124, and enter duct 108—where some of that cold air will pass through arm 121 and outlet 41 and enter room 37, while the rest of that cold air will continue to move through that duct. The vane 124 will minimize any tendency of the cold air to enter the L-shaped housing 122 and to escape through the heat source 126 and blower 130. In addition, the backdraft dampers 129 will help prevent any escape of cold air through that heat source and those dampers.

The cold air which enters the room 37 will tend to decrease the temperature of the air adjacent thermostat 138. However, as long as the temperature of the air adjacent that thermostat is above the upper limit of the control range of that thermostat, that thermostat will continue to provide an output which will cause control unit 140 to develop outputs that will keep the motor of blower 130 inactive, will cause valve controller 136 to leave valve 134 closed, and will cause motor 70 to hold vanes 52 and 56 in their full-open position. Consequently, maximum cooling effect will be supplied to the room 37; and hence the temperature of the air adjacent thermostat 138 will decrease.

When the temperature of that air decreases to the point where it is below the upper limit of the control range, but is above the set point of that thermostat, that thermostat will develop an output which will cause control unit 140 to develop outputs that will continue to keep the motor of blower 130 inactive and will continue to cause valve controller 136 to leave valve 130 closed, but will cause motor 70 to move the vanes 52 and 56 inwardly from their full-open position to a position intermediate that position and their minimum-flow position. As those vanes move to that intermediate position, they will reduce the amount of cold air that will pass through duct 46, and thence through ducts 100 and 108 into room 37. Those vanes also will permit the air which passes through them from duct 46 to develop and maintain a reduced pressure adjacent the right-hand faces of the backdraft dampers 96 and 98. As a result, those backdraft dampers will move to the positions of FIG. 1; and hence will permit air to be drawn upwardly through grille 44 in opening 36, upwardly through the wall 20, through the screens 92 and 94, through the housing 80, between the stops 102 and 104 and the right-hand ends of vanes 52 and 56, and then mixed with the cold air from duct 46.

The grille 44 is located adjacent the floor 40 of room 37; and hence the temperature of the air which is drawn into that grille, and ultimately mixed with the cold air from duct 46, will be relatively cool. Importantly, the temperature of the air which is drawn into the grille 44 will be lower than that of the air adjacent thermostat 138; and hence the air which is aspirated through the spaces adjacent the free ends of vanes 52 and 56 will provide a cooling effect. As a result, that aspirated air will reduce the load on the primary refrigeration unit of the overall system. Also, by reducing the amount of air that is moved through the duct 46, the vanes 52 and 56 will reduce the load on the primary air-moving unit. All of this means that by facilitating the aspiration of air—which is cooler than the set point temperature of the thermostat—into the cold air from duct 46, the vanes 52 and 56 save energy by reducing the horsepower hour consumption of that primary refrigeration unit and of that primary air-moving unit.

The cooling effect provided by the admixed aspirated cool air and the cold air from duct 46 will cause the temperature of the air adjacent thermostat 138 to continue to decrease. As that temperature decreases, but while that temperature is above the set point of that thermostat, the output of that thermostat will cause the control unit to continue to keep the motor of blower 130 inactive and will continue to cause valve controller 136 to leave valve 130 closed. However, that output will change sufficiently to cause the motor 70 to progressively move the vanes 52 and 56 inwardly as the temperature of the air adjacent thermostat 138 moves downwardly toward the set point of the thermostat. The closer that temperature approaches that set point, the closer the free ends of vanes 52 and 56 will be moved toward each other; and, conversely, the further that temperature is displaced from that set point, the further those free ends will be moved away from each other. The combination of the cold air from the duct 46 and the cool air from the lower area of room 37 can, depending upon the amount of heat generated within, or supplied to, that room, hold the temperature of the air adjacent thermostat 138 close to the set point of that thermostat.

In the foregoing description, it was assumed that the temperature of the air adjacent thermostat 138 tended to rise above the set point of that thermostat. If, on the other hand, that temperature tended to fall below that set point, the output of that thermostat would cause the control unit 140 to provide outputs which would cause motor 70 to hold the vanes 52 and 56 in their minimum-flow position, would cause the valve controller 136 to keep valve 134 closed, and would cause the motor of blower 130 to start operating at a low speed. The air which was drawn into the intake of the blower 130 would be from the plenum defined by horizontal member 38 and ceiling 39. That air usually will be warmer than the air adjacent thermostat 138; because it will be drawn from the upper, and hence warmer, area of room 37, and also because it will be heated as it rises upwardly through openings in or adjacent to the lighting fixture 43 and through openings in or adjacent to other lighting fixtures for room 37 and adjacent rooms. If the horizontal member 38 was the roof of the building, and if that roof was not insulated, the air in the plenum between that member and the ceiling 39 would be cool in cold weather. However, a duct, not shown, could be provided to conduct air from a warm place in the building to the intake of blower 130. Whether the air in the plenum between member 38 and the ceiling 39 was warm or warm air was supplied to the intake of blower 130 by a duct, the warmth of the air from that blower would tend to keep the temperature of the air adjacent thermostat 138 from falling below the set point of that thermostat.

However, if that temperature were to fall below that set point, the thermostat 138 would provide an output which would enable control unit 140 to cause the blower 130 to operate at a higher speed. Thereupon, that blower would increase the flow of warm air into the room 37, and would thereby tend to keep the temperature of the air adjacent thermostat 138 close to the set point of that thermostat. If, despite the increased flow of warm air into the room 37, the temperature of the air adjacent that thermostat were to closely approach the lower limit of the control range of that thermostat, the control unit 140 would cause the blower 130 to operate at full speed. The resulting maximum flow of warm air into room 37 would tend to prevent any further decrease in the temperature of the air adjacent thermostat 138. However, if the temperature of the air adjacent that thermostat were to reach the lower limit of the control range, the control unit 140 would cause valve controller 136 to open valve 134. The resulting heat in the heat source 126 would be transferred to the air passing through that heat source; and that heat would be added to the heat which the warm air already had as it entered the inlet of blower 130. The combined heat of that warm air and the heat from heat source 126 would coact to keep the temperature of the air adjacent thermostat 138 from decreasing any further and, instead, would cause that temperature to rise toward the set point of that thermostat. As long as the temperature of the air adjacent thermostat 138 was below the lower limit of the control range of that thermostat, the control unit 140 would keep the blower 130 operating and would keep the valve 134 open. As that temperature rose above that lower limit, the control unit 140 would permit the valve 134 to close; but the blower 130 would continue to supply warm air to room 37. If the temperature of the air adjacent thermostat 138 continued to rise, the speed of that blower would be reduced.

In the foregoing explanation of the operation of the air-handling unit of FIG. 1, it was assumed that the control unit 140 had been set to effect movement of the vanes 52 and 56 to their minimum-flow position before it caused the motor of blower 130 to start operating, and that it had been set to cause that blower to operate at full speed before it caused the valve controller 136 to open valve 134. If desired, the control unit 140 could be set to cause the motor of blower 130 to start operating even before the control unit caused the vanes 52 and 56 to move to their miminum-flow position. Also, that control unit could be set to cause valve 134 to open before that blower reached its maximum speed. However, the air-handling unit of FIG. 1 would provide maximum utilization of the warm air from the plenum between member 38 and ceiling 39, would minimize the amount of heat that had to be supplied to heat source 126, and would minimize the amount of power that had to be supplied to the motor of blower 130, if that motor was not started until the vanes 52 and 56 reached their minimum-flow position and if the valve 134 was not opened until that blower had begun operating at full speed.

The control unit 140 can be adjusted, at the factory or at a building site, to initiate and conclude the full-open to minimum-flow movements of the vanes 52 and 56 at selected temperature levels, to initiate and conclude the operation of the motor of blower 130 at selected temperature levels, and to initiate and conclude the opening of valve 134 at selected temperature levels. As indicated hereinbefore, those selected temperature levels can be made to be discrete or to overlap. As a result, the air-handling unit of FIG. 1 can provide almost any desired sequence of control operations.

It will be noted that the air-handling unit of FIG. 1 can respond to differences between the set point of thermostat 138 and the temperature of the air adjacent that thermostat to selectively provide cold air, cool air, warm air or hot air. Further, it will be noted that the change from cold air to cool air is a progressive change rather than an on-off change. Similarly, the changes from cool air to warm air and from warm air to hot air are progressive changes rather than on-off changes. Further, it will be noted that the change from cold air to cool air is effected automatically. Similarly, the changes from cool air to warm air and from warm air to hot air are effected automatically.

If the control unit 140 were to be set to cause the blower 130 to start operating before vanes 52 and 56 were moved to their minimum-flow position, air would be continuously supplied to room 37, regardless of whether that air was cold, cool, warm or hot. Such an arrangement would be desirable, because it would make certain that the room 37 was ventilated continuously.

The preceding portion of the description has explained how the air-handling unit of FIG. 1 can progressively supply cold, cool, warm and hot air to room 37. Where the temperature of the air adjacent thermostat 138 initially is below, rather than above, the control range of that thermostat, the output of that thermostat will cause control unit 140 to produce outputs which will cause motor 70 to hold vanes 52 and 56 in their minimum-flow position, will cause blower 130 to operate, and will cause valve controller 136 to open valve 134. As the temperature of the air adjacent thermostat 138 moves up to the lower limit of that control range, the valve 134 will be permitted to close, but the blower will continue to operate at full speed. If the temperature of the air adjacent thermostat 138 rises above that lower limit but has not yet reached the set point of that thermostat, the control unit 140 will reduce the speed of blower 130. If the temperature of that air rises to that set point, the blower will be permitted to come to rest. Any further increase in the temperature of that air would cause the vanes 52 and 56 to move out of their minimum-flow position, and thereby permit cold air to pass between them and to aspirate cool air from the lower part of room 37. If the temperature of the air adjacent thermostat 138 tended to continue to rise, the vanes 52 and 56 would be moved to their full-open position to provide maximum cooling effect.

The inclined portion of the upper wall 82 of housing 80 is bent to permit that housing to extend under the blower 130 and under the enclosure 128. If ample horizontal space was available in the plenum between horizontal member 38 and ceiling 39, that upper wall could be made planar, and that wall would be displaced laterally from that blower and that enclosure.

If, due to the air pressure developed by the blower 130 or due to downstream pressure, the pressures at the right-hand faces of the backdraft dampers 96 and 93 fail to remain below the pressures at the left-hand faces of those backdraft dampers, those backdraft dampers will move to their closed positions in abutting relation with the screens 92 and 94, respectively. At such time, those backdraft dampers will prevent escape of air past them into the wall 20. As a result, those backdraft dampers readily permit the aspiration of cool air into the housing 80 but will substantially prevent all loss of air past them from that housing.

The portion of the control unit 140 which controls the actuation of motor 70 can be set to respond to different values of the output from thermostat 138. As a result, the temperature level at which the vanes 52 and 56 are first moved inwardly and away from the resilient stops 102 and 104 can be adjusted. Similarly, the temperature level at which those vanes will move into their minimum-flow position can be adjusted. The portion of the control unit 140 which controls the actuation of the motor for the blower 130 can be set to respond to different values of the output from thermostat 138. As a result, the temperature level at which that motor begins to operate can be adjusted. Similarly, the temperature level at which that motor reaches its full operating speed can be adjusted. The portion of the control unit 140 which controls the actuation of valve controller 136 can be set to respond to different values of the output from thermostat 138. As a result, the temperature level at which the valve 134 is opened can be adjusted. Further, it should be noted that the settings of the three portions of the control unit 140 can be adjusted independently of each other.

The use of a thermostat which can provide a variable output can be combined with the use of a control unit which can provide a variable output to enable the air-handling unit of FIG. 1 to provide any desired range of operation of vanes 52 and 56, of blower 130, and of heat source 126. However, the cost of such a control unit, and the cost of a variable speed motor for that blower and of a variable-flow valve 134 can make the overall cost of a system using that air-handling unit too high for some buildings. The use of a less expensive control unit, of a less expensive motor, and of an on-off valve can materially reduce the cost of a system which uses the air-handling unit of FIG. 1. Even where such a control unit and motor and valve are used, the air-handling unit of FIG. 1 will provide comfort for the occupants of room 37 while effecting substantial savings in the heat supplied to heat source 126 and in the power supplied to the motor for blower 130.

One arrangement which would be economical to use and which would enable the air-handling unit of FIG. 1 to provide comfort while effecting substantial savings in energy would utilize a plural-speed, rather than a variable speed, motor. Another arrangement which would be economical to use and which would enable that air-handling unit to provide comfort while effecting substantial savings in energy would utilize vanes 52 and 56 that were settable in a full-open position, in one intermediate position, and in a minimum-flow position. A very inexpensive arrangement would utilize vanes 52 and 56 that were settable in full-open, in one intermediate, and in minimum-flow positions, would utilize an on-off blower motor, and an on-off valve. Importantly, regardless of the nature of the motor and valve and controls used for the air-handling unit of FIG. 1, that unit can provide comfort while effecting substantial savings in energy, as long as it can aspirate cool air into the cold air from the conventional low pressure cold air duct, can reduce the flow of cold air to a minimum, can draw warm air into the inlet of blower 130 when warm rather than hot air is required, and can add heat to initially warm air. As a result, it should be apparent that the air-handling unit of FIG. 1 is very versatile and can be used with control equipment of differing degrees of sophistication.

It should be noted that ducts, plenums, or other air-confining passages could be used to guide air from the opening 36 to the opening 34 in FIG. 1. Those ducts, plenums, or other air-confining passages could be made from sheet metal, fiberglass, furrings and wallboard, or other conventional construction materials. The use of the spaces between the stud 16 and adjacent studs avoids the cost of ducts, plenums or other air-confining passages.

Referring to FIG. 2, the numeral 144 generally denotes a wall of a building; and a header 146 is located at the top of that wall. A stud 148, plus other studs not shown, extends downwardly from that header to a sill, not shown. The numeral 150 denotes wallboard, plaster-on-lath, or the like which defines the left-hand face of wall 144; and the numeral 152 denotes wallboard, plaster-on-lath, or the like which defines the right-hand face of that wall. The numeral 154 denotes an opening in the left-hand face of wall 144; and the numeral 156 denotes an opening in the right-hand face of that wall which is in register with, but which is considerably larger than, opening 154.

The numeral 158 denotes a conventional low pressure, cold air duct which extends through the openings 154 and 156. Tape, not shown, will be used to seal the joint between the outer surface of that duct and the opening 154. The left-hand end of a tubular socket 160 telescopes over, and is secured to, the right-hand end of duct 158. A hinge 162, that is comparable to hinge 50 of FIG. 1, secures a vane 166 to the upper wall of socket 160. A hinge 164, which is comparable to hinge 54 of FIG. 1, secures a vane 168 to the lower wall of that socket. The numeral 170 generally denotes a linkage which is similar to the linkage constituted by axle 58, lever 60, links 62 and 64, crank arm 66, and connecting rod 68 of FIG. 1. A motor 172, which is similar to motor 70 of FIG. 1, can act through the linkage 170 to cause the vanes 166 and 168 to assume a minimum-flow position, a full-open position wherein the free ends thereof abut resilient stops 196 and 198, or any desired intermediate positions. In that minimum-flow position, the free ends of vanes 166 and 168 will be spaced apart sufficiently to permit the cold air, from duct 158, which passes between them to aspirate air through the spaces between those free ends and resilient stops 196 and 198.

The numeral 173 denotes an angle iron at the upper edge of opening 156, and the number 175 denotes an angle iron at the lower edge of that opening. The numeral 174 generally denotes a housing which encloses the tubular socket 160 and the vanes 166 and 168. That housing has a top wall 176 which has a left-hand horizontal portion, a portion that inclines downwardly from top left to lower right, and a downwardly-directed, vertical, right-hand portion. That housing also has a bottom wall 178 which has a left-hand horizontal portion, a portion which inclines upwardly from lower left to upper right, and an upwardly-directed, vertical, right-hand portion. The side walls of housing 174 are generally hexagonal in configuration. The left-hand end of a duct 194 telescopes into the right-hand end of the housing 174; and angle irons 193 and 195 are secured, respectively, to the top and bottom of that duct. The top wall 176 will be releasably secured to angle irons 173 and 193, and will abut the upper edges of the side walls. The bottom wall 178 will be releasably secured to angle irons 175 and 195, and will abut the lower edges of those side walls. Tape 180 seals the joint between the left-hand edge of housing 174 and the right-hand face of wall 144.

The numerals 182 and 184 denotes screens which are comparable to the screens 92 and 94 of FIG. 1. The numerals 186 and 188 denote backdraft dampers which are comparable to the backdraft dampers 96 and 98 of FIG. 1. Those backdraft dampers normally are in planar condition and in engagement with the right-hand faces of screens 182 and 184; but they will respond to even slight reduced pressures at the right-hand faces thereof to assume the open positions shown by FIG. 2.

The numeral 190 denotes a heat source which is interposed between screen 182 and the vane 166; and the numeral 192 denotes a heat source which is interposed between screen 184 and the vane 168. The resilient stops 196 and 198 are mounted within the left-hand end of duct 194. The numeral 197 denotes a control unit which can respond to a thermostat, not shown, like the thermostat 138 of FIG. 1 to cause motor 172 to provide the desired positions for the vanes 166 and 168 and to cause the heat sources 190 and 192 to provide desired values of heat when warm air is desired.

The wall 144 has an opening, not shown, in the right-hand face thereof which is close to the bottom of the room above which the air-handling unit of FIG. 2 is located. A grille, not shown which is similar to the grille 44 of FIG. 1, is disposed in that opening. That grille will permit air to enter, and to pass upwardly in, that wall.

The air-handling unit of FIG. 2 primarily differs from the air-handling unit of FIG. 1 in not having a blower. As a result, the air-handling unit of FIG. 2 will be able to supply cold air, cool air and warm air, but will not be able to supply untempered hot air.

If the temperature of the air adjacent the thermostat, not shown which controls the control unit 197, is above the upper limit of the control range of that thermostat, the outputs from the control unit 170 will keep the heat sources 190 and 192 from providing heat, and will cause the motor 172 to hold the vanes 166 and 168 in their full-open position. At such time, the cold air from duct 158 will pass directly into the duct 194 without aspirating any air into it. Consequently, maximum cooling effect will be provided at that time.

If the temperature of the air adjacent that thermostat is below the upper limit of the control range, but is above the set point, of that thermostat, the control unit 197 will keep the heat sources 190 and 192 from supplying heat, but will cause the motor 172 to dispose the vanes 166 and 168 in positions intermediate their full-open and their maximum-flow positions. At such time, cold air from the duct 158 will pass between those vanes to enter duct 194, and that cold air will aspirate air inwardly from the housing 176. That aspirated air will be drawn upwardly through the wall 144 from the grille, not shown, in the right-hand face of that wall; and, because that air was close to the floor of the room in which the thermostat is located, that air will be cool. The addition of that cool air to the cold air passing between the vanes 166 and 168 will tend to cause the temperature of the air adjacent the thermostat to move downwardly to, and then remain at, the set point of that thermostat. The movement of the vanes 166 and 168 away from their full-open position will reduce the horsepower hours needed to operate the primary air-moving unit; and the cooling effect of the cool aspirated air will reduce the horsepower hours needed to operate the primary refrigeration unit. As a result, the air-handling unit of FIG. 2 makes it possible to save energy.

If the temperature of the air adjacent the thermostat is at or below the set point of that thermostat, the control unit 197 will develop outputs which will cause the motor 172 to dispose the vanes 166 and 168 in positions intermediate their full-open and their minimum-flow positions, and will cause the heat sources 190 and 192 to provide heat. As cold air flows from duct 158 between the vanes 166 and 168, it will aspirate air from the housing 174; and that aspirated air will be warmed as it passes through the heat sources 190 and 192. The amount of heat supplied by those heat sources will be a function of the difference between the temperature of the air adjacent the thermostat and the set point of that thermostat; and the greater that difference, the greater the amount of heat that will be supplied by those heat sources. Even the minimum amount of heat which is supplied by those heat sources will reduce the cooling effect that is provided by the cold air from duct 158; and hence cool air, rather than cold air, will be supplied by the air-handling unit of FIG. 2 whenever the temperature of the air adjacent the thermostat is at, or just below, the set point of that thermostat. In those instances when the temperature of the air adjacent the thermostat is appreciably lower than the set point of the thermostat, the control unit 197 will cause sufficient heat to be supplied by the heat sources 190 and 192 to cause the air which enters the duct 194 to be warm rather than cold or cool. As a result, the air-handling unit of FIG. 2 can provide cold air, cool air or warm air.

The linkage 170 for the vanes 166 and 168 can be set to hold the free ends of those vanes spaced apart even when the output of the thermostat causes the control unit 197 to provide an output calling for a minimum supply of cold air. Alternatively, stops could be mounted at the interior of the housing 174 to mechanically keep the free ends of those vanes from moving into engagement with each other. In either event, the air-handling unit of FIG. 2 will always be able to supply a minimum flow of air to the duct 194; and hence that air-handling unit will be able to supply ventilation to the rooms which are connected to the duct 194, irrespective of the temperatures of the air within those rooms.

Where the air-handling unit of FIG. 2 is connected to a duct that can supply only cold air, that unit will be unable to supply un-tempered hot air to the duct 194; and, in such event, the latter duct should be used to supply air only to those locations where hot air is not required, or where other heat sources supply heat to those locations. In such event, the unit of FIG. 2 will constitute a source of warm air which can augment the heat supplied by those other heat sources, while also providing ventilation air when those heat sources are active. However, if the air-handling unit of FIG. 2 were to be connected to a duct that could selectively supply cold, cool or warm air, that unit could supply cold, cool, warm or hot air to duct 194. As a result, that duct could be used to supply air to almost any desired location. In all events, the air-handling unit of FIG. 2 will continuously supply ventilation for any location to which it is connected by duct 194.

If desired, the air-handling unit of FIG. 2 could be manufactured without the heat sources 190 and 192. In such event, a simpler control unit 197 could be used; because that control unit would merely need to provide an output which would control the motor 172. Where the air-handling unit of FIG. 2 was manufactured without those heat sources, and where it was connected to a duct that supplied only cold air, it would be able to provide cold air or cool air but not warm air. However, where that unit was connected to a duct that could selectively supply cold, cool or warm air, that unit could supply cold, cool, warm or hot air to duct 194.

Where, as indicated hereinbefore, the air that is drawn upwardly through the wall 144 enters that wall at a point close to the bottom of the room in which the thermostat is located, that air will add to the cooling effect provided by the cold air from duct 158. If desired, however, the air which enters, and then moves upwardly through, the wall 144 to the housing 174 could be admitted close to the ceiling of the room in which the thermostat is located. In such event, that air would tend to warm the air from duct 158. In the former event, the aspirated air would reduce the horsepower hours needed to operate the primary refrigeration unit. In the latter event, the aspirated air would reduce the horsepower hours needed to operate the primary heat source. In both events, the positioning of the vanes 166 and 168 inwardly of their full-open position would reduce the horsepower hours required to operate the primary air-moving unit. As a result, the air-handling unit of FIG. 2 makes it possible to save energy.

If desired, ducts, plenums, or other air-confining passages could be used to guide air from a room or other location to the screens 182 and 184; and those ducts, plenums and other air-confining passages could be made from sheet metal, fiberglass, furrings and wallboard, or other conventional construction materials. Also, if desired, the air-handling unit of FIG. 2 could be displaced from the wall 144, and the opening 156 in that wall could be made just large enough to accommodate the duct 158. In such event, any air which was aspirated into the housing 174 would come from the plenum in which that air-handling unit is located; and that air would usually be warmer than the air adjacent the thermostat in the room which received air from the duct 194. As a result, whenever the motor 172 moved the vanes 166 and 168 inwardly from their full-open position, and where duct 158 supplied only cold air, the air which was aspirated into the housing 174 would tend to reduce the cooling effect of the air supplied to duct 194. If such a reduction in cooling effect was all that was needed, the heat sources 190 and 192 could be left out of the air-handling unit; but, if that reduction in cooling effect was not sufficient, those heat sources could be incorporated into that air-handling unit and used to supply still further heat to the air from duct 158.

As indicated in connection with the air-handling unit of FIG. 1, a control unit 197 could be used which could set the vanes 166 and 168 in any one of a number of positions intermediate their full-open and minimum-flow positions. Alternatively, a control unit could be used which would set those vanes in their full-open, one intermediate, and minimum-flow positions. The use of the former control unit would provide closer control of the temperature of the air in the room with which that control unit was associated; but the latter control unit and the motor 172 controlled thereby would be less expensive than would that former control unit and the motor 172 controlled thereby.

Referring particularly to FIG. 3, the numeral 200 denotes a wall which has a window 206 incorporated therein. A framing member 202 underlies that window, and that framing member helps support a window sill 204. An air-discharge grille 207 is mounted within an opening in that window sill. The numeral 208 generally denotes an under-the-window air-handling unit which is provided by the present invention. The numeral 210 denotes the inner wall of that unit; and that inner wall has a vertically-directed major portion and an upwardly and inwardly inclined minor portion at the top thereof.

The numeral 212 denotes a U-shaped outer top wall for the unit 208, and the numeral 214 denotes a U-shaped outer bottom wall for that unit. End walls, not shown, interconnect the inner wall 210 with the U-shaped outer walls 212 and 214. The numeral 216 denotes a hinge which secures a vane 220 to the inner portion of the U-shaped wall 214. A motor 222 and a linkage 224 are provided to dispose that vane in a minimum-flow position, in any one of a number of partially-open positions, or in a full-open position. If desired, the free end of vane 220 could abut the inner wall 210, and thereby block all flow of air from duct 232, when that vane is in its minimum-flow position; or that free end could be displaced far enough from that wall to enable air from that duct to aspirate air in through the space between that free end and a resilient stop 226 when that vane is in its minimum-flow position. That stop is secured at the inner surface of the U-shaped wall 212, and that stop will be engaged by the free edge of vane 220 when that vane is in its full-open position. The numeral 228 denotes a heat source which is mounted intermediate the U-shaped walls 212 and 214 of the unit 208; and an air-transmitting front cover 230 is provided to conceal that heat source but to permit air to pass through that heat source. The numeral 232 denotes the air duct which extends upwardly through the floor 234 of the building. The numeral 223 denotes a control unit which can be identical to the control unit 197 of FIG. 2; and that control unit will supply outputs to the motor 222 and to a valve controller, not shown, for the inlet valve of heat source 228. A thermostat, not shown, within the room, of which the wall 200, window 206 and floor 234 are parts, will provide outputs that will actuate the control unit 223.

If the duct 232 is connected to a source of low pressure cold air, cold air will tend to pass upwardly between inner wall 210 and vane 220 and then discharge through grille 207. Whenever the temperature of the air adjacent the thermostat in the room is above the upper limit of the control range of that thermostat, the control unit 223 will provide an output which will cause the motor 222 to hold the free edge of vane 220 against the resilient stop 226. At that time, a maximum volume of cold air will flow from duct 232, through unit 208, and out through grille 207.

In the event the temperature adjacent the thermostat is below the upper limit of the control range, but is above the set point, of that thermostat, the control unit 223 will provide an output which will cause the motor 222 to move the vane 220 away from the resilient stop 226, and hence into a partially-open position. The further that temperature is above that set point, the smaller the opening between that stop and the free edge of that vane. If that free edge is to be displaced from inner wall 210 when vane 220 is in its minimum-flow position, the motor 222 and linkage 224 could be set to hold that vane away from that wall when that vane is in its minimum-flow position. Alternatively, stops could be provided at the interior of the air-handling unit 208 to fix the maximum distance through which vane 220 could be rotated in the clockwise direction. In either event, air from duct 232 would be able to flow continuously upwardly through the air-handling unit and discharge through the grille 207; and this would be desirable because it would permit continuous ventilating of the room. In the event the free end of vane 220 engaged the wall 210 when that vane was in its minimum-flow position, any heat in the heat source 228 would cause convection-type air flow inwardly through front cover 230 and heat source 228 and upwardly through grille 207.

As the vane 220 is moved away from the resilient stop 226, the air which moves upwardly at the right-hand face of that vane will aspirate air, from the lower part of the room, into the air-handling unit; and that air will mix with the air from duct 232 and be discharged through the grille 207. The temperature of that aspirated air will be higher than that of the cold air from duct 232; and hence that aspirated air will tend to reduce the cooling effect of that cold air.

As the vane 220 is rotated away from the resilient stop 226, it will reduce the total amount of air which can move upwardly from duct 232. As a result, fewer horsepower hours will be needed to operate the primary air-moving unit. The reduction in cooling effect, which is provided by the aspirated air, will reduce the number of horsepower hours that are required for the heat source which supplies heat to the room. On both grounds, the air-handling unit is able to save energy.

If the temperature of the air adjacent the thermostat is at or below the set point of that thermostat, the control unit 223 will cause the heat source 228 to supply heat. That heat will warm the air which is drawn inwardly through the front cover 230, through that heat source, and then aspirated into the air which moves upwardly from duct 232. The amount of heat which is supplied by the heat source 228 will be a function of the difference between the temperature adjacent the thermostat and the set point of that thermostat; and, the closer that temperature is to that set point, the less heat will be supplied by that heat source. The amount of heat which can be supplied to the aspirated air by that heat source is variable enough to make the air, which issues from grille 207, be cool or warm. In the latter case, a reduction in the number of horsepower hours required to operate a primary heat source for the room can be effected.

Where the air-handling unit of FIG. 3 is connected to a duct that can supply only cold air, that unit will be able to supply hot air only if the vane 220 engages the wall 210 when that vane is in its minimum-flow position; and that hot air will be limited in volume, because it will be convection-type hot air. However, where that unit is connected to a duct which can selectively supply cold, cool or warm air, that unit can supply cold, cool, warm, hot or convection-type hot air.

The air-handling unit of FIG. 3 is compact; and hence it can fit neatly within the space below the window sill of many a room. In any room where a limited amount of heat is all that will ever be needed, and where only a cold air duct is available, that air-handling unit can obviate the cost of providing a primary heat source for that room. Even in a building where only a cold air duct is available, and hence a primary heat source is needed for a room, the augmentary heat, which the air-handling unit of FIG. 3 can provide, will permit savings in energy as well as constant ventilation of that room without the discomfort which could result if the cold air from duct 232 was not warmed.

As indicated in connection with the air-handling unit of FIG. 1, a control unit 223 could be used which could set the vane 220 in any one of a number of positions intermediate its full-open and minimum-flow positions. Alternatively, a control unit could be used which would set that vane in its full-open, one intermediate, and minimum-flow positions. The use of the former control unit would provide closer control of the temperature of the air in the room with which that control unit was associated; but the latter control unit and the motor 222 controlled thereby would be less expensive than would that former control unit and the motor 222 controlled thereby.

In the foregoing descriptions of the air-handling units of FIGS. 2 and 3, it was pointed out that the ducts 158 and 232 could be selectively connected to sources of cold air, cool air or warm air. If desired, those ducts could, in warm or hot weather, be connected to a source of cold air and could, in cool or cold weather, be connected to a source of warm air. One such source of warm air could be a space, within the building in which those air-handling units are located, where the air temperature was well above the set points of the thermostats in the rooms to be supplied with air by duct 194 or by grille 207. Where those air-handling units received warm air from ducts 158 and 232, heat from the heat sources 190 and 192 or from the heat source 228 could add to the heat from that warm air to adequately heat the rooms that were to be supplied by duct 194 or by grille 207.

It should also be noted that where the ducts 158 and 232 were connected to sources to warm air, the air-handling units of FIGS. 2 and 3 could circulate warm air through un-occupied rooms, thereby keeping the temperatures therein well above freezing without any need of supplying heat to the heat sources 190 and 192 or to the heat source 228. Such an arrangement would reduce the heat energy that had to be supplied to those heat sources, and yet would prevent cold-induced damage to those rooms.

Referring particularly to FIG. 4, the numeral 238 generally denotes a wall of a building; and a header 240 is provided at the top of that wall. A stud 242, plus other studs not shown, extends between that header and a sill, not shown. The numeral 244 denotes wallboard, plaster-on-lath, or the like which defines that right-hand surface of wall 238. An opening 246 is provided in wall 238 to accommodate a duct 248; and tape, not shown, will seal the joint between that opening and the outer surface of that duct. The duct will be connected to a conventional source, not shown, of low pressure, cold air.

The numeral 250 generally denotes an air-handling unit which has a top wall 252, a bottom wall 254, an end wall 256, a side wall 258, and a corresponding side wall, not shown. The side wall 258 and that other side wall have their edges screwed, or otherwise secured, to the edges of top wall 252 and end wall 256. The numeral 260 denotes an angle iron which extends between side wall 258 and the other side wall of the air-handling unit 250 to subdivide the left-hand side of that unit into two openings. The numeral 262 denotes an angle iron frame which bounds the left-hand edge of the housing of the air-handling unit 250. The numeral 264 denotes an opening in the bottom of that air-handling unit; and a discharge outlet 290 has the upper end thereof disposed within that opening and has the lower portion thereof forming part of a ceiling 292. An angle iron 259 is adjacent the left-hand edge of opening 264; and the bottom wall 254 is releasably secured to that angle iron and to the bottom of angle iron frame 262, and it will abut the bottom edges of side wall 258 and of the other side wall. The numerals 266 and 268 denote openings in the side wall 258; and those openings can be connected to distributor-type ducts. An opening, not shown, is provided in the end wall 256; and that opening can be connected to a distributor-duct which is indicated by dotted lines in FIG. 4. The numeral 270 denotes a heat source which is mounted within the unit 250; and a baffle plate 272 underlies that heat source. That baffle plate will coact with the top wall 252, the side wall 258, and with the other side wall not shown, to confine air for movement through that heat source. The numeral 274 denotes a multi-vane blower which has the outlet thereof secured adjacent the heat source 270.

The numeral 276 denotes a screen which extends from the left-hand end edge of baffle plate 272 to an angle iron 279 adjacent the bottom wall 254 of unit 250; and that screen inclines downwardly from upper left to lower right at an angle of about four degrees to the vertical. Backdraft dampers 278, which can be identical to the backdraft dampers 96 and 98 of FIG. 1, are mounted at the right-hand face of screen 276. When the pressures at the opposite faces of those backdraft dampers are the same, those backdraft dampers will be planar and will abut the right-hand face of screen 276. Also, when the pressures at the right-hand faces of those backdraft dampers exceed the pressures at the left-hand faces of those backdraft dampers, those backdraft dampers will be planar and will abut the right-hand face of screen 276. However, those backdraft dampers will respond to even very slight reduced pressures at the right-hand faces thereof to bow to the open positions shown by FIG. 4.

The numeral 280 denotes a screen which is similar to the screen 276; and that screen extends from the top wall 252 to the angle iron 260. That screen inclines downwardly from upper left to lower right at an angle of about for degrees to the vertical. The numeral 282 denotes backdraft dampers which can be identical to the backdraft dampers 278; and, when the pressures at the opposite faces of those backdraft dampers are the same, those backdraft dampers will be planar and will abut the right-hand face of screen 280. Also, when the pressures at the right-hand faces of those backdraft dampers exceed the pressures at the left-hand faces of those backdraft dampers, those backdraft dampers will be planar and will abut the right-hand face of screen 280. However, those backdraft dampers will respond to even very slight reduced pressures at the right-hand faces thereof to bow to the open positions shown by FIG. 4.

The numeral 284 denotes butterfly vanes or dampers that are pivotally mounted adjacent the discharge end of duct 248. A motor 286 and a linkage 288 of standard and usual design can set and hold those vanes or dampers in minimum-flow position, in open position, or in any desired intermediate position. A control unit 293, which can be the same as the control unit 140 of FIG. 1, is mounted on the air-handling unit 250. That control unit is connected to a thermostat, not shown, like the thermostat 138 of FIG. 1; and it also is connected to motor 286, to a motor, not shown, for the blower 274, and to a valve controller, not shown, for a valve in the inlet line for heat source 270. The numeral 294 denotes a duct which is connected to the unit 250 and which has its outlet confronting the screen 280. The numeral 295 denotes a lighting fixture which is seated in the ceiling 292.

The air-handling unit 250, with its heat source 270, its blower 274, its screens 276 and 280, its backdraft dampers 278 and 282, its butterfly dampers 284, its motor 286, and its linkage 288 can be shipped and installed as an integrated air-handling unit. After that air-handling unit has been delivered to, and installed at, a building site, the ducts 248 and 294, any distributor-ducts, and the discharge outlet 290 can be secured to it. The duct 248 can be connected to a conventional source of low pressure cold air; and the duct 294 can be connected to an air discharge grille, not shown, in the ceiling 292 of the room or to a warm space in the building.

If the temperature of the air adjacent the thermostat in the room is above the upper limit of the control range of that thermostat, the control unit 293 will keep the motor of the blower 274 de-energized, will keep the heat source 270 from providing any heat, and will cause the motor 286 to hold the butterfly vanes 284 in their full-open position. At such time, the low pressure cold air from duct 248 will flow past those butterfly vanes and then past the back-draft dampers 278 for movement through the distributor-type ducts connected to the openings 266 and 268, through similar openings in the air-handling unit 250, and also through outlet 290 into the room of which the ceiling 292 is a part. Some low pressure cold air may flow through the inactive blower 274 and the heat source 270; but no air will escape through the duct 294, because the backdraft dampers 282 will be abutting the screen 280. The resulting maximum cooling effect for that room will reduce the temperature of the air within that room, and hence will cause the temperature of the air adjacent the thermostat to decrease.

When the temperature of that air decreases to the point where it is below the upper limit of the control range, but is above the set point, of that thermostat, that thermostat will develop an output which will cause control device 293 to develop outputs that will continue to keep the motor of blower 274 inactive and will continue to keep heat from being developed by heat source 270, but will cause motor 286 to move the butterfly dampers 284 away from their full-open position to an intermediate position. As those vanes move to that intermediate position, they will reduce the amount of cold air that will pass through duct 248, and hence into the room. The cooling effect provided by that cold air will cause the temperature of the air adjacent that thermostat to continue to decrease. As that temperature decreases, but while that temperature is above the set point of that thermostat, the output of that thermostat will cause the control unit to continue to keep the motor of blower 274 inactive and will continue to keep the heat source 270 from supplying heat. However, that output will change sufficiently to cause the motor 286 to progressively move the butterfly vanes 284 away from their full-open position as the temperature of the air adjacent the thermostat moves downwardly toward the set point of that thermostat. The closer that temperature approaches that set point, the closer the vanes 284 will be moved toward their minimum-flow position; and, conversely, the further that temperature is displaced from that setpoint, the further those vanes will be displaced from that minimum-flow position.

If the temperature of the air adjacent the thermostat decreases to the set point of that thermostat, the output of that thermostat will cause the control unit 293 to provide outputs which will cause motor 286 to hold the vanes 284 in minimum-flow position, will cause the motor of blower 274 to start operating at a low speed, and will continue to keep the heat source 270 from supplying heat. The air which is drawn into the intake of the blower 274 usually will be warmer than the air adjacent the thermostat; and hence a finite, albeit small, amount of heat will be supplied to air which flows downwardly through outlet 290. That heat will tend to keep the temperature of the air adjacent the thermostat from falling below the set point of that thermostat.

However, if that temperature were to fall below that set point, that thermostat would provide an output which would enable control unit 293 to cause the blower 274 to operate at a higher speed. If the temperature of the air adjacent the thermostat were to approach the lower limit of the control range of that thermostat, the control unit 293 would cause the blower 274 to operate at full speed. At such time, the warmth of the air entering the inlet of blower 274 would tend to keep the temperature of the air adjacent the thermostat from decreasing any further. However, if that temperature were to fall below the lower limit of the control range of the thermostat, the control unit 293 would cause heat to be supplied to the heat source 270. That heat, plus the heat in the warm air supplied to the inlet of blower 274 by duct 294, would keep the temperature of the air adjacent the thermostat from falling any further and, instead, would cause that temperature to rise toward the set point of that thermostat. As long as the temperature of the air adjacent the thermostat is below the lower limit of the control range of that thermostat, the control unit 293 will act to keep the blower 274 operating at full speed and to keep the heat source 270 supplying heat. When the temperature of that air rises above that lower limit, the control unit 293 will cause heat source 270 to become inactive; and, as that temperature rises toward the set point of the thermostat, that control unit will reduce the speed of blower 274. The closer that temperature approaches that set point, the slower the speed of that blower; and, conversely, the further that temperature is below that set point, the faster the speed of that blower.

The backdraft dampers 278 will readily open whenever the vanes 284 are in partially-open or full-open positions. However, those dampers will close whenever the blower 274 is operating; and they also will close whenever the downstream pressure exceeds the pressure at the left-hand faces thereof.

Whenever the butterfly dampers 284 are moved out of their full-open position, they will reduce the amount of cold air flowing through the duct 248; and hence they will reduce the horsepower hours of the primary air-moving unit. When the blower 274 draws warm air inwardly from the duct 294, that warm air will reduce the durations of the heating periods of the heat source 270, and also will reduce the amount of heat which that heat source must provide during those heating periods. As a result, the air-handling unit of FIG. 4 acts to reduce the amount of energy needed to cool a building and also acts to reduce the amount of energy needed to heat that building.

The duct 294 will be important in any community where a building code prohibits the drawing of air into the inlet of blower 274 directly from the plenum above the ceiling 292. Also, that duct would be important in a cold climate where the air-handling unit was immediately adjacent an insufficiently-insulated roof, and hence where the air in the plenum could be colder than the air in the room of which the ceiling 292 is a part; because that duct could extend to, and communicate with, a space in the building where warm air collects. In those communities where the building codes do not require such a duct, and where the air in the plenum in warm, that duct can be eliminated. At such time, the air which is drawn into the air-handling unit 250, when the blower 274 operates, will be drawn directly from the plenum above the ceiling 292; and that air will be warmed by heat from the lighting fixture 295 and from similar lighting fixtures. If desired, the duct 294 could be connected to a passage within the wall 238 which was comparable to the passage in the wall 20 in FIG. 1 or in the wall 144 of FIG. 2. Depending upon where the air was permitted to enter that wall, cool air or warm air would pass from duct 294 into the air-handling unit 250.

As indicated in connection with the air-handling unit of FIG. 1, a control unit 293 could be used which could set the butterfly vanes 284 in any one of a number of positions intermediate their full-open and minimum-flow positions. Alternatively, a control unit 293 could be used which would set those butterfly vanes in their full-open, one intermediate, and minimum-flow positions. The use of the former control unit would provide closer control of the temperature of the air in the room with which that control unit was associated; but the latter control unit and the motor 286 controlled thereby would be less expensive than would that former control unit and the motor 286 controlled thereby.

Figure 5:
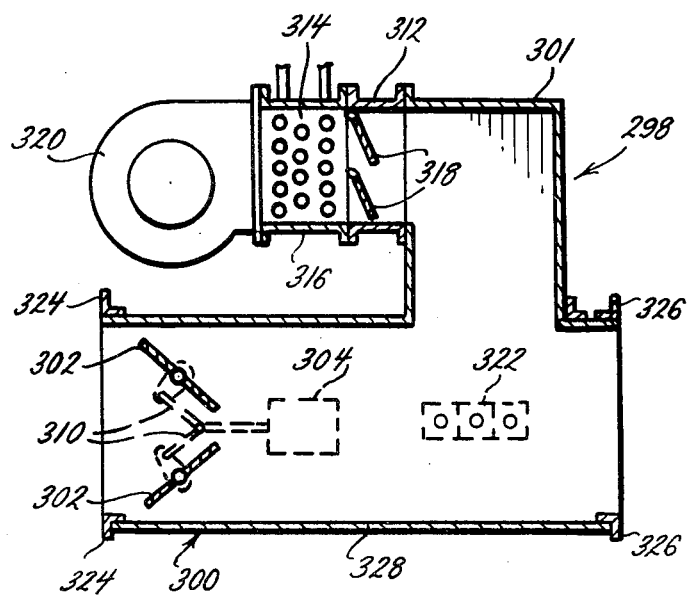
FIG. 5 is a vertical section of a fifth preferred embodiment of air-handling unit provided by the present invention.

Referring particularly to FIG. 5, the numeral 298 generally denotes another preferred embodiment of air-handling unit which is provided by the present invention. That unit includes a housing 300 which has an upwardly-extending arm 301. Butterfly vanes or dampers 302 are mounted within the housing 300 adjacent the left-hand end thereof; and a motor 304 and a linkage 310 control the settings of those vanes or dampers. A tubular connection 312 is connected to an opening in the arm 301; and the housing 316 of a heat source 314 is connected to that arm by that tubular connection. Backdraft dampers 318, which can be similar to the backdraft dampers 129 in FIG. 1, are mounted at the outlet of heat source 314. A multi-vane blower 320 has the output thereof connected to the input of heat source 314. A control unit 322, which can be identical to the control unit 140 of FIG. 1, will supply outputs for the motor 304, for the motor of blower 320, and for the control for heat source 314.

Angle iron frames 324 and 326 are provided at the left-hand and right-hand ends, respectively, of the housing 300. The bottom wall 328 of that housing is releasably secured to the angle iron frames 324 and 326 and will abut the lower edges of the side walls of that housing.

It will be noted that the air-handling unit 298 resembles the air-handling unit 250 of FIG. 4, in that it has a left-hand inlet in which butterfly vanes are mounted, has a heat source, has a blower, and has a control unit which can control the setting of those butterfly vanes, the speed of that blower, and the amount of heat supplied by that heat source. The air-handling unit 298 primarily differs from the air-handling unit 250 in that the inlet of blower 320 opens directly into the space where that air-handling unit is mounted, whereas the inlet of blower 274 opens into air-handling unit 250 and is connected to a source of air by screen 280 and by duct 294—when such a duct is used. The air-handling unit 298 also differs from the air-handling unit 250 in being less expensive to manufacture.

The temperature-responsive sequence of operations of the air-handling unit 298 can be identical to the temperature-responsive sequence of operations of the air-handling unit 250. As a result, the temperature-responsive sequence of operations of the air-handling unit 298 will not be described.

The backdraft dampers 96 and 98 of FIG. 1, the backdraft dampers 186 and 188 of FIG. 2, and the backdraft dampers 278 and 282 of FIG. 4 can be made in different ways and from different materials. However, a flexible glass cloth is very useful, because it is fire resistant. In areas where fire resistance is not of primary significance, rubberized fabrics or flexible plastics could be used in making the backdraft dampers. A stiffening rod or an elongated weight member is shown attached to the lower edge of each backdraft dmaper. That rod or member will not only stiffen the lower edge of the backdraft damper, but also will serve to urge that backdraft damper toward its closed position.

It should be noted that the blowers 130, 274 and 320 of FIGS. 1, 4 and 5, respectively, are displaced wholly away from the path for the low pressure cold air in the air-handling units of those views. Similarly, it should be noted that the heat sources 126, 270 and 314 of FIGS. 1, 4 and 5, respectively, are displaced wholly away from that path. This is very desirable; because it completely obviates the frictional losses which would develop if that low pressure cold air had to pass through those blowers and through those heat sources. Similarly, it should be noted that the heat sources 190 and 192 of FIG. 2 and the heat source 228 of FIG. 3, respectively, are displaced wholly away from the low pressure cold air in the air-handling units of those views. This is desirable; because it completely obviates the frictional losses which would develop if that low pressure cold air had to pass through those heat sources.

It should be noted that the air-handling units of FIGS. 1-3 aspirate air only when the vanes of those units are displaced from their full-open positions. This is desirable; because it enables those air-handling units to provide maximum cooling effect whenever those vanes are in their full-open positions. In contrast, some prior air-handling units have continuously aspirated air into the cold air passing through them; and hence those units could never provide un-mixed cold air. It should also be noted that as the air-handling units of FIGS. 1-3 aspirate cool air, they reduce the amount of cold air which is supplied by the primary air-moving unit and they also reduce the amount of cooling effect which must be supplied by the primary refrigeration unit. This is desirable; because it reduces the horsepower hours required to operate the primary air-moving unit and also reduces the horsepower hours required to operate the primary refrigeration unit.

The air which is drawn into the air-handling units of FIGS. 1, 2, 4 and 5 can, where suitable ducts are provided, be drawn from the lower portions of rooms, from the upper portions of rooms, from warm spaces in buildings, from cool spaces in buildings, or from the exteriors of buildings. As a result, such air can have desirable temperature and freshening characteristics. By providing a number of air-handling units, of the type shown in any of FIGS. 1, 2, 4 or 5, throughout the air-distributing system of a building, it is possible to add air of desirably different temperatures to different areas of that building. This is in contrast to many prior air-distributing systems for buildings, wherein substantially all of the air had to be supplied to, and pass through, the primary air-moving unit. By making it possible to supply air at different places throughout an overall air-distributing system, the air-handling units of the present invention also make it possible to reduce the overall size of the primary air-moving unit. All of this means that the present invention makes it possible to supply air of desirably-different temperatures to various points in an air-distributing system and also makes it possible to reduce the total amount of energy needed to operate that air-distributing system.

A number of air-distributing systems, such as double duct systems or systems that use multizone air vents, which utilize hot and cold air ducts also utilize cold and warm mixing dampers. Other air-distributing systems cool all of the air which is supplied to various air-handling units in a building and then use heat sources in those units to warm or reheat the air. The present invention makes it possible to eliminate such cold and warm mixing dampers and also makes it possible to avoid the energy losses involved in supplying cold air to the heat sources in the air-handling units of a building, and yet makes it possible to provide variable air volume in a large air-distributing system. The present invention does so by mounting an air-handling unit in each zone duct which extends from the primary air-handling unit. The air-handling unit of FIG. 2 is particularly useful for this purpose; and, when it is used for that purpose, it could have the heat sources 190 and 192 thereof removed.

The air-handling units of FIGS. 1-5 are easily incorporated into air-distributing systems that are newly installed in buildings. Also, the air-handling units of FIGS. 1, 2, 4 and 5—and particularly the unit of FIG. 2—can be incorporated into already-installed air-distributing systems in buildings. All that need be done is to cut out a section of the already-installed duct and replace it with one of those air-handling units.

The incorporation of any of the air-handling units of FIGS. 1, 2, 4 and 5 into an already-existing air-distributing system would not permit the escape of cold air or of hot air, even if that air-distributing occasionally developed larger-than-normal downstream pressures; because the backdraft dampers within that unit would prevent the escape of cold air and of hot air from that unit. The incorporation of any of those air-handling units into an already-existing air-distributing system could permit a desirable decrease in the average air pressure in the ducts of that system; because the pressure drop across each of those units can be as low as one hundredth of an inch water gauge. Any changes in the total amounts of air which must be supplied to the various air-handling units can be effected by changing the positions of the adjustable, but normally-fixed, dampers within the various supply ducts of the overall air-distributing system. All of this means that the present invention permits aspiration of air into an air-distributing system—with resulting decreases in the horsepower hours required to operate the primary air-moving unit and the primary refrigeration unit; and yet prevents loss of cold air or of hot air if larger-than-normal downstream pressures develop.

The air-handling units of FIGS. 4 and 5 are shown with butterfly vanes instead of elongated vanes of the type shown in FIGS. 1-3. In any installations where the additional space required by such elongated vanes is available and where the air aspiration provided by such elongated vanes is desired, the air-handling units 250 and 298 could have the butterfly vanes thereof replaced by elongated vanes of the type shown in FIGS. 1-3.

If desired, one of the air-handling units of FIGS. 1, 2, 4 and 5 could be mounted immediately adjacent the outlet of the primary air-moving unit of an air-distributing system. That air-handling unit would permit the volume of air which was delivered to the air-distributing system to be varied without varying the speed of that primary air-moving unit and without providing a bypass circuit around that air-moving unit. Further, that air-handling unit would make it possible to aspirate substantial quantities of make up air into the air which was delivered by that primary air-moving unit.

The air-handling units of FIGS. 1 and 2 could, if desired, be mounted in, or adjacent to, the discharge openings into rooms or other spaces. In such instances, the backdraft dampers and the heat sources of those units could be deleted. Those air-handling units would be able to vary the volume of cold air supplied to the rooms served by them, and also would be able to induce make-up air into that cold air. In doing so, those air-handling units would facilitate the maintaining of the desired temperatures within those rooms, and also would provide desirably high volumes of ventilating air for those rooms.

The air-handling units of FIGS. 1, 4 and 5 can be used to effect substantial savings in energy whenever the temperatures of the building in which they are installed need not be maintained at normal levels—as on weekends or on holidays. Specifically, when the temperatures within the building need not be maintained at normal levels, the primary air source for that building can be shut down, and the blowers of those air-handling units can be operated at low speeds and the heat sources of those air-handling units can be made to supply low values of heat. The resulting finite, albeit small, movement of heated air will keep the temperatures within the building from falling to undesirably-low levels, but will keep the total amount of heat energy and air-moving energy required by the building well below the amount which would be needed to maintain the temperatures within that building at normal levels.

The air-handing units of FIGS. 1, 4 and 5 make it possible to provide desired values of air flow when cooling effect is being supplied to a room, and yet make it possible to provide distinctively different desired values of air flow when heating effect must be supplied to that room. For example, a class room in a school might require from one thousand to fifteen hundred cubic feet per minute of air when cooling effect is being supplied but could use as few as six hundred cubic feet per minute of air when heating effect is being supplied. Because the control units of those air-handling units can be set to keep the heat sources of those air-handling units inactive as long as those air-handling units are supplying cold air, and because those control units can be set so the flow of cold air is minimized when the heat sources are activated, the present invention makes it possible to cause the volumes of air which are supplied during a heating cycle to be distinctively different from the volumes of air which are supplied during a cooling cycle. As a result, the air-handling units of FIGS. 1, 4 and 5 make is possible to save energy, and yet provide desirable temperature control, by moving smaller air volumes during heating cycles than it supplies during cooling cycles.

As indicated hereinbefore, the blowers of the air-handling units of FIGS. 1, 4 and 5 can be left inactive until the flow of cold air into those air-handling units is minimized, or those blowers can be caused to start operating while the vanes in those air-handling units are in intermediate positions close to their minimum-flow positions. Further, the heat sources of those air-handling units can be caused to supply heat as soon as the blowers begin to operate, or they can be caused to remain inactive while those blowers supply warm make-up air during periods when the temperature adjacent the thermostat in the room is close to the set point of that thermostat. This highly desirable ability to provide discrete or overlapped supplying of cold air, cool air, warm air and hot air eliminates the need for precise calibration of the thermostat. Consequently, the movable temperature-setting element of the thermostat need only have the word WARM adjacent an arrow which points in one direction and the word COOL adjacent a second arrow which points in the opposite direction. The person who is to set the desired temperature for the room need only set that movable element in an initial intermediate position, and then subsequently shift that element in the desired direction to establish the desired temperature setting.

The control units 140, 197, 223, 293 and 322, for the air-handling units of FIGS. 1–5, are shown as being made of two or three commercially-available control elements. If desired, however, each of those control units could be made specially as a single element rather than as a combination of a plurality of commercially-available control elements.

The opening, in the air-handling unit 250 of FIG. 4, which permits ingress of make up air is shown in the left-hand end of the housing of that air-handling unit. However, if desired, that opening and the screen 280 therefor, could be located in the portion of side wall 258 that is close to the inlet of blower 274. Alternatively, that opening and that screen could be located in the portion of the opposite side wall that is close to the inlet of that blower. Those openings could be made as "knockout" openings in those side walls, so either or both of those sidewalls could be left intact. As a result, the air-handling unit of FIG. 4 can be shipped to a building site; and can have the make-up air opening therein located at the most optimum place in the housing thereof.

The bottom wall 254 of that air-handling unit has been shown as made so it can be removed as a unit to provide ready and full access to the interior of that air-handling unit. Also, that bottom wall can be made to be imperforate and to extend all the way to the end wall 256. In that event, the opening 264 will be located in a duct which is connected to a large outlet opening, not shown, in that end wall. Moreover, if desired, the openings 266 and 268 can be eliminated or made as "knockout" openings.

The blower 274 and the motor therefor preferably are mounted so they can easily be lowered from their positions within that air-handling unit. In that event, they can easily be cleaned, repaired or replaced. If desired, the two butterfly dampers 284 could be replaced by a single large butterfly damper.

Whereas the drawing and accompanying description have shown and described several preferred embodiments of the present invention, it should be apparent to those skilled in the art that various changes may be made in the form of the invention without affecting the scope thereof.

What I claim is:

1. An air-handling unit which has a first inlet that is connectable to a source of low pressure air, a second inlet through which air can be aspirated into said air-handling unit, an outlet from which air can issue, positionally adjustable volume-controlling means intermediate said first and second inlets and said outlet which can directly adjust the volumes of air that can pass from said first and second inlets to said outlet, said adjustable volume-controlling means being adapted to respond to the movement of low pressure air therethrough from said first inlet to said outlet to aspirate air thereacross into said air-handling unit through said second inlet solely in response to a reduction in pressure adjacent said second inlet and across said adjustable volume-controlling means due to the position of said adjustable volume-controlling means and movement of air therethrough and intermediate said first and second inlets and said outlet to permit said aspirated air to mix with said air from said first inlet, and a backdraft damper adjacent said second inlet, said backdraft damper being adapted to respond to a predetermined flowing air pressure level within said air-handling unit to permit aspiration of air through said second inlet, said backdraft damper responding to a higher predetermined flowing air pressure level within said air-handling unit to substantially block said second inlet, whereby said air-handling unit can be used in an air-distributing system wherein the air pressure can be below said predetermined air pressure level and can subsequently rise above said predetermined air pressure level.

2. An air-handling unit as claimed in claim 1 wherein said source of low pressure air supplies cold air, and wherein said second inlet can communicate with a source of cool air, whereby said air which passes to said outlet is a mixture of cold air and cool air.

3. An air-handling unit as claimed in claim 1 wherein said outlet can communicate with a room, wherein said source of low pressure air supplies cold air, wherein said second inlet can communicate with a space within a wall of said room, and wherein air can be drawn into said space within said wall from a point adjacent the floor of said room, whereby said aspirated air is drawn into said space within said wall from said point adjacent said floor of said room, and is moved upwardly through said space within said wall before it enters said second inlet.

4. An air-handling unit as claimed in claim 1 wherein said source of low pressure air supplied cold air, and wherein said second inlet can communicate with a source of warm air, whereby said air which passes to said outlet is a mixture of cold air and warm air.

5. An air-handling unit as claimed in claim 1 wherein said adjustable volume-controlling means includes an elongated vane which is disposed so it is generally parallel to an air-flow path between said first inlet and said outlet, and wherein a motor can move one end of said elongated vane transversely of said air-flow path to vary the volume of air moving from said first inlet through said air-flow path.

6. An air-handling unit as claimed in claim 1 wherein said adjustable volume-controlling means includes an elongated vane which is disposed so it is generally parallel to an air-flow path between said first inlet and said outlet, wherein a motor can move one of said elongated vane transversely of said air-flow path to vary the volume of air moving from said first inlet through said air-flow path, and wherein said one end of said elongated vane varies the volume of said aspirated air as said one end is moved transversely of said air-flow path to vary the volume of air moving from said first inlet through said air-flow path, whereby said elongated vane can respond to said motor to move transversely of said air-flow path and simultaneously vary the volume of said aspirated air and the volume of air moving from said first inlet through said air-flow path.

7. An air-handling unit as claimed in claim 1 wherein said adjustable volume-controlling means includes an elongated vane which is disposed so it is generally parallel to an air-flow path between said first inlet and said outlet, wherein a motor can move one end of said elongated vane transversely of said air-flow path to vary the volume of air moving from said first inlet through said air-flow path, wherein said one end of said elongated vane varies the volume of said aspirated air as said one end is moved transversely of said air-flow path to vary the volume of air moving from said first inlet through said air-flow path, wherein said one end of said elongated vane increases the volume of said aspirated air as it decreases the volume of air moving from said first inlet through said air-flow path.

8. An air-handling unit as claimed in claim 1 wherein said adjustable volume-controlling means includes an elongated vane which is disposed so it is generally parallel to an air-flow path between said first inlet and said outlet, wherein said adjustable volume-controlling means includes a second elongated vane which is disposed so it is generally parallel to said air-flow path between said first inlet and said outlet, wherein a motor can provide movement of said elongated vanes to full-open position, to closed position, and to a plurality of intermediate positions, wherein minimum air is aspirated through said second inlet whenever said elongated vanes are in said full-open position, wherein maximum air is aspirated through said second inlet whenever said elongated vanes are in said closed position, and wherein varying volumes of air are aspirated through said second inlet when said elongated vanes are set in various of said intermediate positions.

9. An air-handling unit as claimed in claim 1 wherein said adjustable volume-controlling means includes an elongated vane which is disposed so it is generally parallel to an air-flow path between said first inlet and said outlet, wherein the leading edge of said elongated vane is held for pivotal movement, wherein a motor can move the trailing edge of said elongated vane transversely of said air-flow path to vary the volume of air moving from said first inlet through said air-flow path, and wherein said backdraft damper is closer to said leading edge than to said trailing edge of said elongated vane.

10. An air-handling unit as claimed in claim 1 wherein a heat source is provided to supply heat to said aspirated air before said aspirated air can mix with said air that moves from said first said inlet through said air-flow path.

11. An air-handling unit as claimed in claim 1 wherein a heat source is provided to supply heat to said aspirated air before said aspirated air can mix with said air that moves from said first said inlet through said air-flow path, and wherein said heat source is located between said backdraft damper and the point where said aspirated air can mix with said air that moves from said first said inlet through said air-flow path.

12. An air-handling unit which has a first inlet that is connectable to a source of low pressure air, a second inlet through which air from a second source of air can be aspirated into said air-handling unit, an outlet for said air-handling unit from which air can issue, positionally adjustable volume-controlling means intermediate said first and second inlet and said outlet which can directly adjust the volumes of air that can pass from said first and second inlets to said outlet, said air which passes from said first inlet to said outlet aspirating air across said adjustable volume controlling means solely in response to a reduction in pressure adjacent said second inlet due to the position of said adjustable volume-controlling means and movement of air therethrough and intermediate said first and second inlets and said outlet into said air-handling unit from said second source of air, said second source of air supplying air which has a temperature that is different from the air supplied by said source of low pressure air, said aspirated air mixing with said air that passes from said first inlet to said outlet, said adjustable volume-controlling means automatically, as it adjusts the volume of air that passes from said first inlet to said outlet, directly adjusting the volume of air which is aspirated thereacross into said air-handling unit from said second source of air.

13. An air-handling unit as claimed in claim 12 wherein an air-moving device can draw air from a third source of air and cause said air to mix with said air that passes from said first inlet to said outlet.

14. An air-handling unit as claimed in claim 12 wherein an air-moving device can draw air from a third source of air and cause said air to mix with said air that passes from said first inlet to said outlet, and wherein said air-moving device is displaced from the path through which said air passes from said first inlet to said outlet.

15. An air-handling unit as claimed in claim 12 wherein a heat source can supply heat to air which is mixed with said air that passes from said first inlet to said outlet, and wherein said heat source is displaced from the path through which said air passes from said first inlet to said outlet.

16. An air-handling unit as claimed in claim 12 wherein an air-moving device can draw air from a third source of air and cause said air to mix with said air that passes from said first inlet to said outlet, and wherein a heat source can supply heat to said air which is drawn from said third source of air and is caused to mix with said air that passes from said first inlet to said outlet.

17. An air-handling unit as claimed in claim 12 wherein an air-moving device can draw air from a third source of air and cause said air to mix with said air that passes from said first inlet to said outlet, wherein a heat source can supply heat to said air which is drawn from said third source of air and is caused to mix with said air that passes from said first inlet to said outlet, and wherein said air-moving device and said heat source are displaced from the path through which said air passes from said first inlet to said outlet.

18. An air-handling unit as claimed in claim 12 wherein a backdraft damper is adjacent said second inlet, wherein said backdraft damper responds to a pressure differential in one direction to open and thereby permit air to be aspirated into said air-handling unit, and wherein said backdraft damper responds to a pressure differential in the opposite direction to close and thereby prevent undesired escape of air from said air-handling unit.

19. An air-handling unit as claimed in claim 12 wherein a perforate member is adjacent said second inlet, wherein a backdraft damper is mounted adjacent to but inwardly of said perforate member, wherein said backdraft damper responds to a pressure differential in one direction to open by moving away from said perforate member and thereby permit air to be aspirated into said air-handling unit, and wherein said backdraft damper responds to a pressure differential in the opposite direction to move against said perforate member to close and thereby prevent undesired escape of air from said air-handling unit.

20. An air-handling unit as claimed in claim 12 wherein a perforate member is adjacent said second inlet, wherein a backdraft damper is mounted adjacent to but inwardly of said perforate member, wherein said backdraft damper responds to a pressure differential in one direction to open by moving away from said perforate member and thereby permit air to be aspirated into said air-handling unit, wherein said backdraft damper responds to a pressure differential in the opposite direction to move against said perforate member to close and thereby prevent undesired escape of air from said air-handling unit, and wherein said perforate member inclines inwardly from the top edge thereof to the bottom edge thereof to underlie and inwardly displace the lower edge of said backdraft damper, whereby said backdraft damper normally bears against said perforate member to be in its closed position.

21. An air-handling unit as claimed in claim 12 wherein a backdraft damper is adjacent said second inlet, wherein said backdraft damper responds to a pressure differential in one direction to open and thereby permit air to be aspirated into said air-handling unit, wherein said backdraft damper responds to a pressure differential in the opposite direction to close and thereby prevent undesired escape of air from said air-handling unit, and wherein said backdraft damper is flexible and can flex away from said perforate member to open.

22. An air-handling unit as claimed in claim 12 wherein said adjustable volume-controlling means includes at least one elongated vane that has one end thereof movable transversely of the path through which said air passes from said first inlet to said outlet.

23. An air-handling unit as claimed in claim 12 wherein said adjustable volume-controlling means includes a plurality of elongated vanes, wherein each of said elongated vanes has one end thereof movable transversely of the path through which said air passes from said first inlet to said outlet, and wherein said one ends of said elongated vanes are movable to a full-open position or to a minimum-flow position.

* * * * *